(12) United States Patent
Plodinec et al.

(10) Patent No.: US 12,544,050 B2
(45) Date of Patent: Feb. 10, 2026

(54) CORE BIOPSY NEEDLE

(71) Applicants: UNIVERSITÄT BASEL, Basel (CH); ARTIDIS AG, Basel (CH)

(72) Inventors: Marija Plodinec, Basel (CH); Ludovit Pavel Zweifel, Basel (CH); Philipp Maximillian Oertle, Basel (CH); Armin Stumpp, Neerach (CH); Marko Loparic, Basel (CH)

(*) Notice: Subject to any disclaimer, the term of this patent is extended or adjusted under 35 U.S.C. 154(b) by 444 days.

(21) Appl. No.: 16/753,784

(22) PCT Filed: Oct. 5, 2018

(86) PCT No.: PCT/EP2018/077132
§ 371 (c)(1),
(2) Date: Apr. 5, 2020

(87) PCT Pub. No.: WO2019/068864
PCT Pub. Date: Apr. 11, 2019

(65) Prior Publication Data
US 2020/0253590 A1 Aug. 13, 2020

(30) Foreign Application Priority Data
Oct. 5, 2017 (EP) .................................. 17195070

(51) Int. Cl.
*A61B 10/02* (2006.01)
*A61L 24/10* (2006.01)
*A61B 17/00* (2006.01)
*A61B 17/32* (2006.01)

(52) U.S. Cl.
CPC ........ *A61B 10/0275* (2013.01); *A61L 24/108* (2013.01); *A61B 2017/00951* (2013.01); *A61B 2017/320064* (2013.01)

(58) Field of Classification Search
CPC ... A61B 10/02; A61B 10/0233; A61B 10/025; A61B 10/0275
See application file for complete search history.

(56) References Cited

U.S. PATENT DOCUMENTS

| | | | |
|---|---|---|---|
| 9,101,350 B2 * | 8/2015 | Stanley | A61B 10/0266 |
| 2002/0007130 A1 * | 1/2002 | Burbank | A61B 18/12 |
| | | | 600/564 |
| 2003/0236471 A1 | 12/2003 | Fisher | |
| 2010/0152615 A1 * | 6/2010 | Mark | A61B 10/0275 |
| | | | 600/567 |

(Continued)

FOREIGN PATENT DOCUMENTS

| | | |
|---|---|---|
| EP | 1476069 | 11/2004 |
| JP | S50100882 | 8/1975 |

(Continued)

*Primary Examiner* — Si Ming Ku
(74) *Attorney, Agent, or Firm* — JMB Davis Ben-David

(57) ABSTRACT

The invention relates to a core biopsy needle (1) for obtaining a tissue sample comprising a hollow outer needle (10) extending along a longitudinal axis (L), and an inner needle (20), which is at least partially arranged or arrangeable within said outer needle along said longitudinal axis (L), wherein said inner needle (20) comprises at least one tissue-holding surface (21), wherein said tissue-holding surface (21) is adapted such that a tissue (3) adheres to the at least one tissue-holding surface (21), when the core biopsy needle (1) is inserted into the tissue (3).

12 Claims, 5 Drawing Sheets

(56) References Cited

U.S. PATENT DOCUMENTS

| | | | |
|---|---|---|---|
| 2010/0331883 A1* | 12/2010 | Schmitz | A61B 17/320758 |
| | | | 606/279 |
| 2011/0190660 A1 | 8/2011 | Levy | |
| 2013/0046201 A1 | 2/2013 | Stanley et al. | |
| 2013/0102925 A1* | 4/2013 | McGhie | A61B 10/0275 |
| | | | 600/567 |
| 2014/0142614 A1* | 5/2014 | Gallagher | A61H 7/001 |
| | | | 606/201 |
| 2016/0045190 A1 | 2/2016 | Elfman et al. | |
| 2016/0081678 A1* | 3/2016 | Kappel | A61B 10/06 |
| | | | 600/567 |

FOREIGN PATENT DOCUMENTS

| | | |
|---|---|---|
| JP | 2009095667 | 5/2009 |
| JP | 2012161473 | 8/2012 |
| WO | 2010100780 | 9/2010 |
| WO | 2012015771 | 2/2012 |
| WO | 2016199599 | 12/2016 |

* cited by examiner

CORE BIOPSY NEEDLE

CROSS-REFERENCE TO RELATED APPLICATIONS

This is the U.S. National Stage of International Patent Application No. PCT/EP2018/077132 filed on Oct. 5, 2018, which claims priority to European Patent application Ser. No. 17/195,070.2 filed on Oct. 5, 2017.

FIELD

The invention relates to a core biopsy needle for obtaining a complete tissue sample from a biological tissue.

BACKGROUND OF THE INVENTION

Biopsy taking is an important method which allows removing samples of a tissue or cells from a living body (human or animal) for further analysis, in particular suspected tumorous tissue for subsequent cancer diagnosis.

Several types of biopsy methods are known in the art of medicine. For example, during fine needle aspiration biopsy, a thin needle with an outer diameter of less than 1 mm is inserted into the tissue, and tissue liquid together with cells of the tissue of interest is aspirated through the needle. In contrast, core biopsy according to the prior art uses thick needles with an outer diameter larger than 1 mm (less than 20 gauge), and applies a cutting mechanism, by which a complete tissue cylinder is cut out of the tissue of interest and removed.

For example, a common type of core biopsy needle comprises an outer needle and an inner needle which is positioned in the outer needle. After insertion of the needle into the tissue, the inner needle is extended into the tissue, for example by a spring load mechanism, wherein a part of the tissue is forced into a notch in the inner needle. Subsequently, the outer needle is moved forward, for example by a further spring load mechanism while the inner needle remains in the target tissue, and the part of the tissue in the notch is cut by a cutting edge of the outer needle, such that a complete tissue sample remains in the notch of the inner needle, after which the core biopsy needle is withdrawn from the tissue.

For some types of core biopsy needles, a vacuum is used in addition to the cutting mechanism to capture the obtained tissue sample in the core biopsy needle.

In order to obtain a complete tissue sample, which is important for subsequent histological analysis and other diagnostic methods, core biopsy needles of the prior art require outer diameters of more than 1 mm, ideally 14 gauge (2.11 mm). When using smaller needle of the prior art, smaller tissue pieces are obtained which tend to contain not enough of viable tissue and cells, which impairs subsequent sample preparation which is in particular necessary for reliable histological assessment of tissue and/or cancer diagnosis.

Disadvantageously, due to their large needle outer diameters, core biopsy needles of the prior art tend to result in some of the possible side effects including, but not limited to, bruising or hematoma of the breast, swelling of the breast, pain or soreness at the injection site, an altered appearance of the breast. Furthermore, a relatively complicated biopsy procedure including for example the application of local anesthesia and/or a surgical incision prior to inserting the needle is required at least in some cases when using core biopsy needles of the prior art which prolongs the time of the procedure and could contribute to the side effects.

Therefore, the objective of the present invention is to provide a core biopsy needle of reduced needle outer diameter which allows obtaining complete tissue samples which is prerequisite for successful pathohistological assessment.

SUMMARY OF THE INVENTION

This objective is attained by the subject matter of claim 1.

DETAILED DESCRIPTION

A first aspect of the invention relates to a core biopsy needle for obtaining a tissue sample, wherein the core biopsy needle comprises a hollow outer needle, particularly shaped as a hollow cylinder, wherein the outer needle extends along a longitudinal axis, and an inner needle, which is at least partially arranged or arrangeable within the outer needle along the longitudinal axis, wherein the inner needle comprises at least one tissue-holding surface, wherein the tissue-holding surface is adapted such that a tissue adheres to the at least one tissue-holding surface, particularly by chemisorption and/or physisorption and/or friction, when the core biopsy needle is inserted into the tissue.

The core biopsy needle is adapted such that the tissue-holding surface of the core biopsy needle can get in contact and adhere to a tissue of interest in which the core biopsy needle is inserted. In particular, when a cutting mechanism of the core biopsy needle is activated, the tissue sample cut from the tissue of interest by the cutting mechanism (that is for example a tissue core), adheres to the tissue-holding surface.

In particular, the at least one tissue-holding surface may be rough, that is the at least one tissue-holding surface may comprise regular or irregular protrusions and/or grooves. For example, the tissue-holding surface may comprise a surface micro structuring.

In case protrusions and/or grooves are present on the tissue-holding surface, the tissue-holding surface may interact with the tissue by means of friction. More particularly, the protrusions and/or grooves may correspond to protrusions and/or grooves on the surface of the tissue, for example on the surface of cells or extracellular matrix comprised in the tissue, such that protrusions of the tissue-holding surface are inserted into corresponding grooves on the tissue surface and/or that protrusions on the tissue surface are inserted into corresponding grooves on the tissue-holding surface. This may generate static friction, when the tissue surface is stationary in respect of the tissue-holding surface, or dynamic friction, when the tissue surface is moving in respect of the tissue-holding surface.

Alternatively, or additionally, the at least one tissue-holding surface may be adapted to interact with the tissue surface by adsorption. That is, the material of the tissue-holding surface may comprise atoms or molecules adapted to establish non-covalent bonds (wherein the adsorption is physisorption) or covalent bonds (wherein the adsorption is chemisorption) with atoms or molecules of the tissue surface, for example atoms or molecules on the cell surface of cells comprised in the tissue. For example, this may be achieved by a chemical modification of the tissue-holding surface to enhance tissue adhesion.

Advantageously, the tissue sample can be held in place on the inner needle by the tissue-holding surface. Furthermore, the tissue sample can be mechanically stabilized, fixed, and/or protected (for example prevented from breaking into pieces) by the tissue-holding surface, such that a complete, non-fragmented tissue sample can be removed from the tissue of interest. In particular, with the core biopsy needle according to the invention, smaller tissue samples (for example tissue samples having a smaller outer diameter in respect of the longitudinal axis of the core biopsy needle) can be obtained and removed from the tissue of interest in a complete form (without breaking into pieces) compared to core biopsy needles of the prior art due to the tissue-holding surface. Therefore, in particular, the outer diameter of the core biopsy needle according to the invention can be reduced compared to the prior art, more particularly to less than 1 mm (more than 20 gauge), which was not feasible so far. In turn, this results in less side effect including pain for the patient during the biopsy procedure and allows a time efficient and simpler core biopsy method, for example without use of anesthetics and prior surgical incisions.

In certain embodiments, the core biopsy needle is adapted to be inserted into a tissue.

In certain embodiments, the tissue-holding surface is adapted to interact by adhesion with a tissue provided at the at least one tissue-holding surface.

In certain embodiments, the tissue-holding surface is adapted to interact by adsorption, particularly chemisorption or physisorption, with a tissue provided at the at least one tissue-holding surface.

In certain embodiments, the tissue-holding surface is adapted to interact by friction with a tissue provided at the at least one tissue-holding surface.

In certain embodiments, the core biopsy needle comprises a cutting mechanism for removing a tissue sample from the tissue in which the core biopsy needle is inserted.

In the scope of the present specification, the term 'core biopsy needle' is used in its meaning known in the art of medicine. In particular, the term 'core biopsy needle' is to be understood as a biopsy needle comprising an inner needle and an outer needle, wherein the biopsy needle is adapted to extract a complete tissue sample (also termed 'tissue cylinder' or 'tissue core') from a tissue, when the core biopsy needle is inserted into the tissue.

In the scope of the present specification, the term 'tissue' is used in its meaning known in the art of biology and medicine, and particularly designates a biological tissue, that is a portion of cells, more particularly connected by an extracellular matrix.

In the scope of the present specification, the term 'tissue-holding' designates the ability of a surface to adhere to a surface of biological tissue, in particular by chemisorption, physisorption, and/or friction.

Therein, the term 'adhesion' is to be understood as the tendency of particles or surfaces, in particular dissimilar particles or surfaces, to stick to each other.

The term 'adsorption' designates the adhesion of particles to a surface, and comprises chemisorption and physisorption (also termed physical adsorption).

Therein, the term 'chemisorption' describes an adsorption, in which covalent chemical bonds are formed between the particles and the surface, and the term 'physisorption' describes an adsorption, in which the interaction between the particles and the surface occurs by non-covalent interactions, for example van der Waals interactions, ionic interactions, or hydrogen bonds.

The term 'friction' designates a resistance between two surfaces to moving along the interface of the surfaces in respect of each other when an external force is applied. Friction is designated as static friction when the two surfaces are not moving in respect of each other, and designated as dynamic friction when the two surfaces are moving in respect of each other.

In certain embodiments, the inner needle is movable in respect of the outer needle, particularly by means of a translational movement or a rotational movement. In particular, in case of a translational movement, the inner needle is extended into the tissue (relative to the outer needle), wherein a part of the tissue is brought into contact with the tissue-holding surface.

In certain embodiments, the inner needle comprises at least one stitching edge, particularly positioned at the tip of the inner needle, wherein the inner needle is adapted to be forced into the tissue by means of the stitching edge.

In certain embodiments, the outer needle comprises at least one cutting edge, particularly positioned at or near the tip of the outer needle, wherein the cutting edge is adapted to introduce a cut into the tissue.

For example, the outer needle is moved forward, while the inner needle remains in the target tissue, and the part of the tissue adhering to the tissue-holding surface on the inner needle is cut by the cutting edge, such that a complete tissue sample remains on the tissue-holding surface.

In certain embodiments, the inner needle comprises at least one notch, wherein the at least one notch comprises the at least one tissue-adhesive surface. For example, a part of the tissue, in which the inner needle is inserted, may be forced into the notch, and the cutting edge of the outer needle may cut the part of the tissue. Due to the at least one tissue-holding surface on the notch, the tissue sample remains in the notch in a complete form.

In particular, the inner needle may be hollow or compact (that is the inner needle may or may not contain an internal cavity).

In certain embodiments, the outer needle comprises a maximum extension of less than 1.2 mm, particularly less than 1 mm, transversely (that is perpendicular) to the longitudinal axis. In particular, in case the outer needle has a circular cross-section (for example is cylindrical), the maximum extension is a maximum outer diameter of the outer needle.

Thereby, core biopsy needles in the size range known for fine aspiration needles can be provided. This advantageously reduces possible side effects and pain experienced by the patient during the biopsy procedure and simplifies the biopsy method.

In certain embodiments, the at least one tissue-holding surface comprises a plurality of protrusions, each having a length extending along the longitudinal axis, a width extending in a circumferential direction in respect of the longitudinal axis, and a height extending in a radial direction in respect of the longitudinal axis.

When protrusions are provided on the tissue-holding surface for generating friction with corresponding tissue surfaces, removal of the tissue sample from the tissue-holding surface in a complete form is facilitated.

In certain embodiments, the ratio between the width of the protrusions and the length of the protrusions is at least 2 to 1.

In certain embodiments, the ratio between the length of the protrusions and the width of the protrusions is at least 2 to 1.

In certain embodiments, the ratio between the height of the protrusions and the width of the protrusions is at least 1 to 1.

In certain embodiments, the ratio between the height of the protrusions and the length of the protrusions is at least 1 to 1.

In certain embodiments, the ratio between the height of the protrusions and the width of the protrusions is at least 1 to 1, and the ratio between the height of the protrusions and the length of the protrusions is at least 1 to 1.

In certain embodiments, the height of the protrusions is 1 µm to 100 µm, particularly 10 µm to 80 µm, more particularly 24 µm to 40 µm.

In certain embodiments, the width of the protrusions is 1 µm to 100 µm, particularly 10 µm to 80 µm.

In certain embodiments, the length of the protrusions is 1 µm to 100 µm, particularly 10 µm to 80 µm.

In certain embodiments, the width of the protrusions is 1 µm to 100 µm, particularly 10 µm to 80 µm, and the length of the protrusions is 1 µm to 100 µm, particularly 10 µm to 80 µm.

Advantageously, tissue-holding surfaces comprising protrusions having the above-described dimensions adhere to tissue of interest, particularly breast tissue, more particularly breast tumorous tissue. In particular, the dimensions of the protrusion correspond to measured roughness and porosity of breast tissue samples, resulting in enhanced adhesion between the tissue-holding surface and the tissue surface.

In certain embodiments, the protrusions comprise peaks positioned at a maximum height of the respective protrusion. In particular, each protrusion comprises a respective peak. Therein, the term peak is meant to describe a pointed structure.

In certain embodiments, a surface of the protrusions comprises a curvature, wherein particularly the surface is concave.

In certain embodiments, the protrusions are arranged in a wave-like pattern. In other words, the height of protrusions changes periodically along the width and/or the length. Such structures, especially "shark fin" shaped protrusions display especially advantageous adhesion properties with tissue surfaces, resulting in complete tissue samples.

In certain embodiments, the protrusions are arranged periodically. In other words, the protrusions comprise the same shape and are arranged at equal distance to each other along the length and/or width.

In certain embodiments, the protrusions are arranged non-periodically. In other words, the protrusions comprise different shapes and/or are arranged at different distances to each other along the length and/or width.

In certain embodiments, the protrusions are shaped as pyramids, particularly comprising a square-shaped base. Pyramid-shaped protrusions display especially advantageous adhesion properties with tissue surfaces, resulting in complete tissue samples.

In certain embodiments, the protrusions are shaped as cones, truncated cones or cylinders, particularly comprising a circular base. In particular, the cones, truncated cones or cylinders comprise an aspect ratio between their height and their length of at least 1 to 1 and/or an aspect ratio between their height and their width of at least 1 to 1.

In the context of the present specification, such a shape is also termed 'brush like shape'.

Therein, in particular, the protrusions have a triangular cross-sectional shape perpendicular to the width and the length.

A triangular cross-sectional shape refers to triangles with any angle between its edges, for example an acute triangle or an obtuse triangle. In particular, the triangular cross-sectional shape has the shape of an isosceles triangle or a right-angled triangle.

Brush-like protrusions display especially advantageous adhesion properties with tissue surfaces, resulting in complete tissue samples.

In certain embodiments, the protrusions comprise a triangular cross-sectional shape perpendicular to the width and a rectangular or square-shaped cross-sectional shape perpendicular to the length or a triangular cross-sectional shape perpendicular to the length and a rectangular or square-shaped cross-sectional shape perpendicular to the width.

In the context of the present specification, such a shape is termed 'saw tooth like shape'.

Therein, a triangular cross-sectional shape refers to triangles with any angle between its edges, for example an acute triangle or an obtuse triangle. In particular, the triangular cross-sectional shape has the shape of an isosceles triangle or a right-angled triangle. Saw tooth shaped protrusions display especially advantageous adhesion properties with tissue surfaces, resulting in complete tissue samples.

In certain embodiments, the protrusions comprise a cross-sectional shape perpendicular to the width or the length, wherein said cross-sectional shape is delimited by at least three edges, wherein at least one of the edges is curved.

In the context of the present specification, such a shape is termed 'shark fin like shape'.

In particular, the at least one curved edge comprises a concave shape.

In particular, one of the edges is curved, wherein the curved edge is positioned opposite to a right angle between the edges adjacent to the curved edge.

Shark fin shaped protrusions display especially advantageous adhesion properties with tissue surfaces, resulting in complete tissue samples.

In certain embodiments, the tissue-holding surface forms a non-periodic structure, wherein the tissue-holding surface comprises a plurality of protrusions.

In certain embodiments, the protrusions comprise an average height of 1 µm to 100 µm, particularly 10 µm to 80 µm, more particularly 24 µm to 40 µm, transversely to the longitudinal axis.

In certain embodiments, the protrusions comprise an average length of 1 µm to 100 µm, particularly 10 µm to 80 µm, along the longitudinal axis.

In certain embodiments, the protrusions comprise an average width of 1 µm to 100 µm, particularly 10 µm to 80 µm, along a circumferential direction in respect of the longitudinal axis.

In certain embodiments, the at least one tissue-adhesive surface comprises a plurality of grooves, each having a length extending along the longitudinal axis, a width extending in a circumferential direction in respect of the longitudinal axis, and a depth extending in a radial direction in respect of the longitudinal axis.

In certain embodiments, the ratio between the width of the grooves and the length of the grooves is at least 2 to 1.

In certain embodiments, the ratio between the length of the grooves and the width of the grooves is at least 2 to 1.

In certain embodiments, the ratio between the depth of the grooves and the width of the grooves is at least 1 to 1.

In certain embodiments, the ratio between the depth of the grooves and the length of the grooves is at least 1 to 1.

In certain embodiments, the ratio between the depth of the grooves and the width of the grooves is at least 1 to 1, and the ratio between the depth of the grooves and the length of the grooves is at least 1 to 1.

In certain embodiments, the depth of the grooves is 1 μm to 100 μm, particularly 10 μm to 80 μm, more particularly 24 μm to 40 μm.

In certain embodiments, the width of the grooves is 1 μm to 100 μm, particularly 10 μm to 80 μm.

In certain embodiments, the length of the grooves is 1 μm to 100 μm, particularly 10 μm to 80 μm.

In certain embodiments, the width of the grooves is 1 μm to 100 μm, particularly 10 μm to 80 μm, and the length of the grooves is 1 μm to 100 μm, particularly 10 μm to 80 μm.

In certain embodiments, the grooves comprise respective troughs positioned at a maximum depth of the respective groove.

In certain embodiments, the surface of the grooves comprises a curvature.

In certain embodiments, the grooves are shaped as negative pyramids, particularly comprising a square-shaped base.

In certain embodiments, the grooves have a negative saw tooth like shape.

In certain embodiments, the grooves have a negative shark fin like shape.

In certain embodiments, the grooves have a negative brush like shape.

In certain embodiments, the tissue-holding surface is generated on an inner needle of a core biopsy needle, particularly by laser ablation.

In certain embodiments, the tissue-holding surface is generated on a blank, for example a metal plate, wherein the inner needle of the core biopsy needle is fabricated from the blank.

In certain embodiments, the tissue-holding surface comprises at least one tissue-adhesive compound which is adapted to adhere to the tissue by chemisorption and/or physisorption.

In certain embodiments, the at least one tissue adhesive compound is a glue, particularly a silicon composite or a cyanoacrylate based glue.

In certain embodiments, the tissue adhesive compound comprises cyanoacrylate.

In certain embodiments, the at least one tissue adhesive compound comprises a tackifier. Therein, the term 'tackifier' describes a chemical compound which is adapted to increase the tack or stickiness of the surface of an adhesive, in particular when added to the adhesive compound.

In certain embodiments, the at least one tissue-adhesive compound is bio-compatible according to the standard ISO 10993.

In certain embodiments, the at least one tissue-adhesive compound is a polymer, or a biopolymer, particularly a peptide, polypeptide or protein, more particularly selected from the group consisting of arginine-glycine-aspartic acid tripeptides, poly-L-lysine, albumin, collagen I, fibrin, and gelatin.

Therein, the term 'biopolymer' refers to polymers which are synthesized or can be synthesized by biological cells. Biopolymers include polysaccharides, proteins, glycoproteins, peptides, and nucleic acids.

In certain embodiments, the at least one tissue-adhesive compound is a chemical cross-linker, wherein particularly the cross-linker is an aldehyde, more particularly formaldehyde or glutaraldehyde.

Therein, the term 'chemical cross-linker' refers to a compound which is able to generate covalent chemical bonds between different molecules by means of a chemical reaction.

A further aspect of the invention relates to a method for performing a core biopsy by means of the core biopsy needle according to the present invention.

In certain embodiments, the method comprises inserting the core biopsy needle into a tissue, and obtaining a tissue sample from the tissue, wherein the tissue-holding surface is in contact with the tissue sample.

BRIEF DESCRIPTIONS OF THE DRAWINGS

Further embodiments and advantages may be derived from the figures and the example described hereafter, wherein the figures and the example are meant to illustrate the invention, but not to limit its scope.

Figure 1:
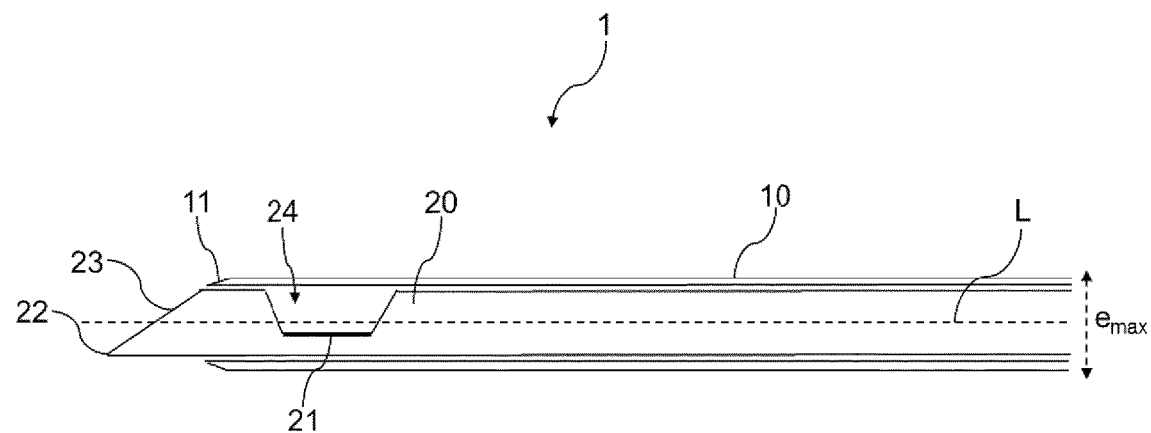
FIG. 1 shows a schematic of a core biopsy needle according to the invention.

FIG. 1 shows a core biopsy needle 1 extending along a longitudinal axis L, wherein the core biopsy needle 1 comprises a hollow outer needle 10 having a maximum cross-sectional extension $e_{max}$ transversely to the longitudinal axis L, and an inner needle 20, which is partially arranged within the outer needle 10. At the proximal end of the core biopsy needle 1 (left end in FIG. 1), the outer needle 10 comprises a cutting edge 11, and the inner needle 20 comprises a facet cut 23 ending in a stitching edge 22. The inner needle 20 further comprises a notch 24 and a tissue-holding surface 21 positioned at the bottom of the notch 24. The tissue-holding surface 21 is adapted to adhere by chemisorption, physisorption, and/or friction to a tissue 3 provided at the tissue-holding surface 21, for example by means of protrusions 40 on the tissue-holding surface 21 (thereby enhancing the friction between the tissue-holding surface 21 and the tissue 3), or by means of a tissue-adhesive compound comprised in the tissue-holding surface 21. For example, the tissue-holding surface 21 may consist of the tissue-adhesive compound or may be coated with the tissue-adhesive compound.

Figure 2:
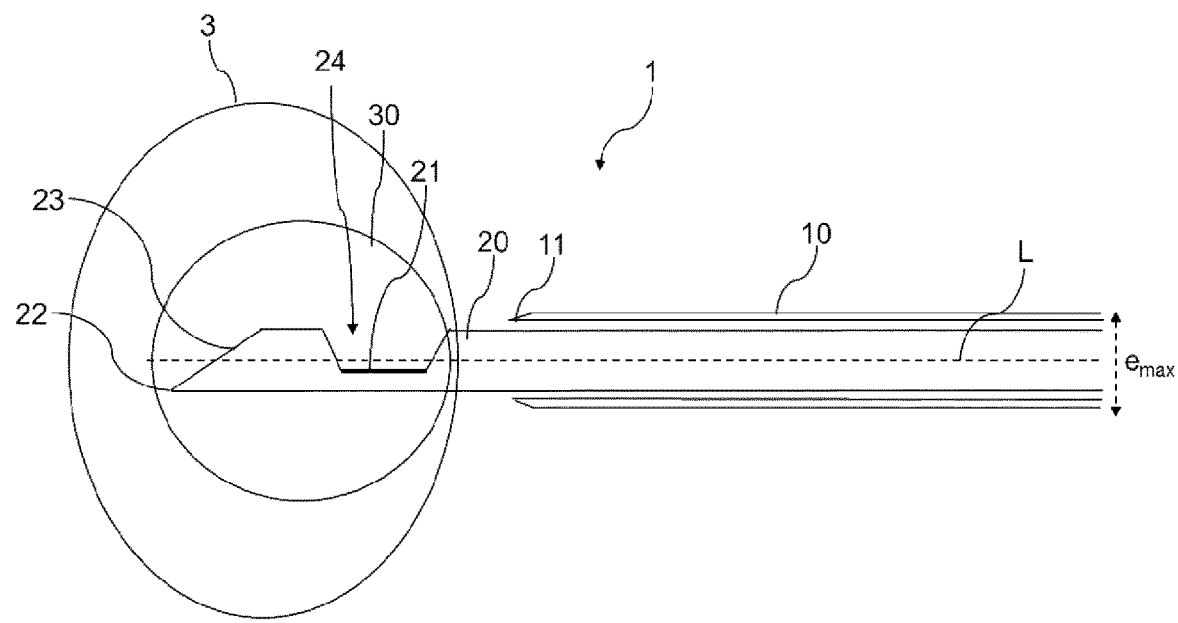
FIG. 2 shows a schematic of a core biopsy needle according to the invention in a first configuration inserted into a tissue of interest.
Figure 3:
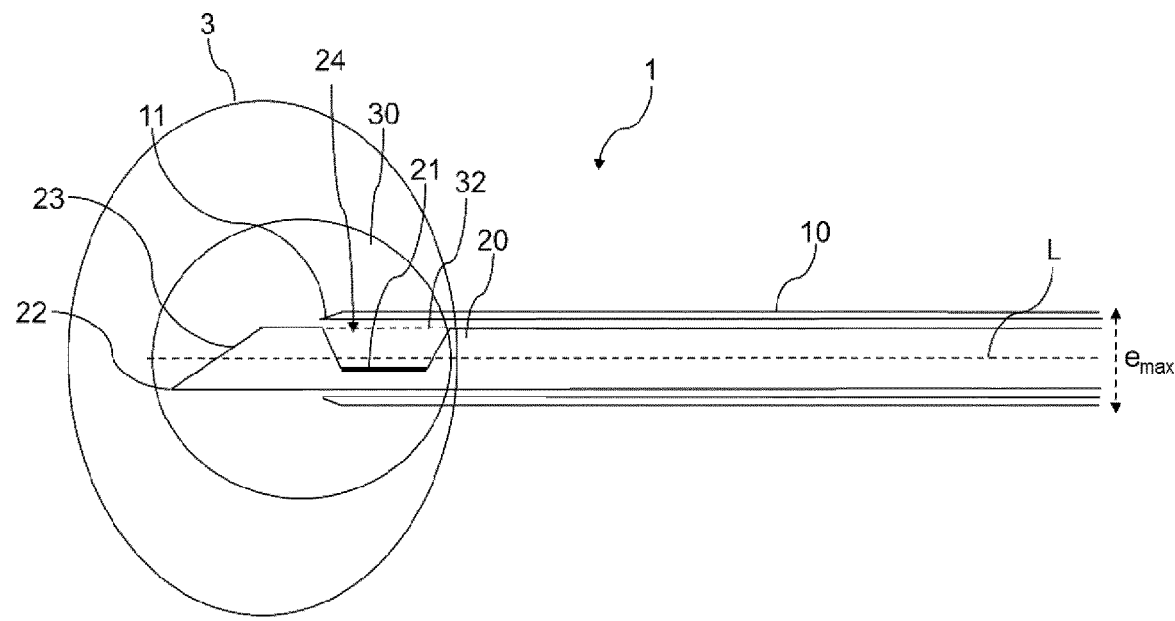
FIG. 3 shows a schematic of a core biopsy needle according to the invention in a second configuration inserted into a tissue of interest.
Figure 4:
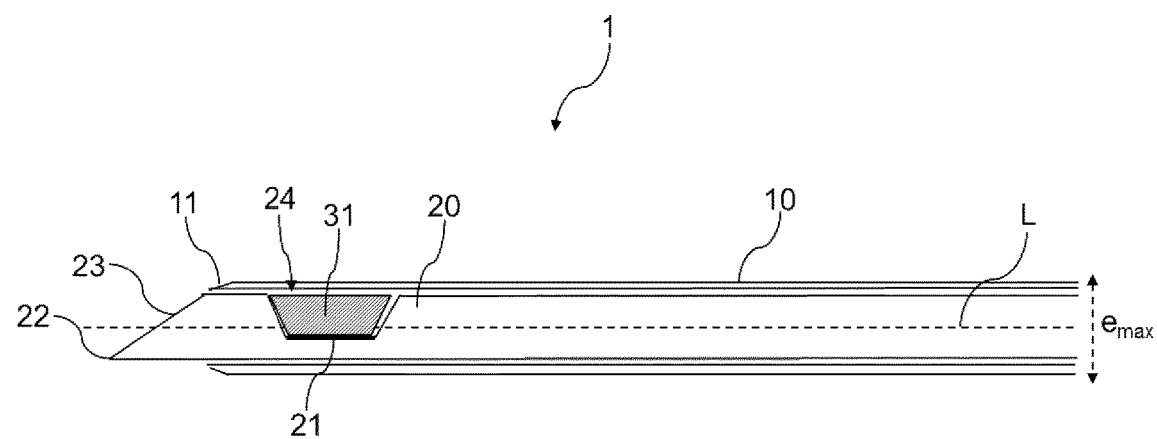
FIG. 4 shows a schematic of a core biopsy needle comprising a tissue sample.

FIG. 2 illustrates the functional principle of the core biopsy needle 1 in conjunction with FIGS. 3 and 4. Therein, FIG. 2 depicts the core biopsy needle 1 in a first configuration in which a section of the inner needle 20 is inserted into a tissue region 30, of a tissue 3, particularly a tumor.

Compared to the configuration shown in FIG. 1, the inner needle 20 is extended forward into the tissue 3 in respect of the outer needle 10. For example, this relative movement between the inner needle 20 and the outer needle 10 may be achieved by a spring load mechanism, or comparable means known from the prior art. The inner needle 20 is adapted to penetrate the tissue 3 when moving forward, particularly due to its stitching edge 22. The notch 24 of the inner needle 20 is positioned within the tissue region 30, such that a part of the tissue 3 from the tissue region 30 is forced into the notch 24. Thus, a part of the surface of this part of tissue 3 adheres to the tissue-holding surface 21, such that the friction between the tissue 3 and the tissue-holding surface 21 is enhanced, or such that the tissue 3 binds to the tissue-holding surface 21, for example by adhesion.

FIG. 3 illustrates a second configuration of the core biopsy needle 1, wherein the core biopsy needle 1 is partially positioned in the tissue 3, and wherein the outer needle 10 has been moved forward along the longitudinal axis L into the tissue region 30, for example by means of a further spring load mechanism. During the forward movement of the outer needle 10 in respect of the inner needle 20, the cutting edge 11 of the outer needle 10 generates a cut 32 in the tissue 3 in the tissue region 30, which separates the tissue 3 in the notch 24 from the surrounding tissue 3, thus forming a tissue sample 31 enclosed by the outer needle 10. During the cutting procedure and thereafter, the tissue sample 31 is fixed and mechanically stabilized by its adhesion to the tissue-holding surface 21, such that the tissue sample 31 stays complete during the biopsy.

FIG. 4 shows the core biopsy needle 1 after it has been removed from the tissue 3. The tissue sample 31 is contained in the notch 24 fixed and stabilized by the tissue-holding surface 21 and enclosed by the outer needle 10. In a further step, the complete tissue sample 31 can be removed from the notch 24 in order to analyze the tissue sample 31, for example by histology techniques according to the prior art in order to identify whether the tissue sample 31 contains tumor cells.

FIGS. 5 to 9 show schematics of different embodiments of the tissue-holding surface 21 of the inner needle 20 of a core biopsy needle 1 according to the invention, wherein the tissue-holding surface 21 comprises protrusions 40 to enhance friction between the tissue 3 and the tissue-holding surface 21.

The schematics and diagrams depicted in FIGS. 5 to 9 are not drawn to scale, but are meant to illustrate general examples of the arrangement and shape of the protrusions 40 of the tissue-holding surface 21. In particular, the size of the protrusions 40 depicted in FIGS. 5O, 6C, 7C, 8C and 9C does not correspond to the scale of the respective schematically drawn second needle 20. As described above, favorable embodiments of the tissue-holding surface 21 comprise protrusions 40 in the micrometer range, whereas the outer diameter of the inner needle 20 is typically in the sub-millimeter to millimeter range. However, the schematic representation of the inner needle 20 is included in the drawings to illustrate the orientation of the width x and length y of the protrusions 40.

The width x extends along a circumferential direction in respect of the longitudinal axis L, the length y extends along said longitudinal axis L, and the height z extends along a radial direction in respect of the longitudinal axis L. Due to the curvature of the inner needle 20, as thus the curvature of the tissue-holding surface 21, the schematics depicted in FIGS. 5 to 9 are idealized projections illustrating the approximate positioning of the protrusions 40.

Figure 5:
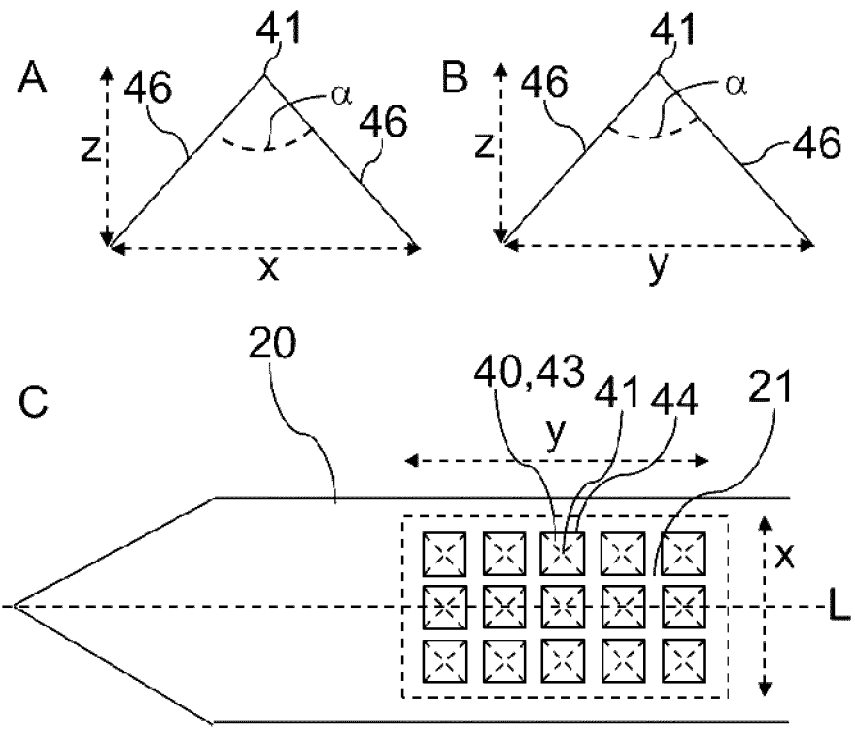
FIG. 5 shows schematics of a tissue-holding surface of a core biopsy needle according to the invention, comprising pyramid shaped protrusions.

FIG. 5 shows a first embodiment of the tissue-holding surface 21 comprising protrusions 40 having the shape of pyramids 43 with a square-shaped base 44.

FIG. 5A shows a cross-section of a protrusion 40 along the plane formed by the width x and the height z, and FIG. 5B shows a cross-section of a protrusion 40 along the plane formed by the length y and the height z. The edges 46 delimiting the cross-sectional shape of the protrusions 40 and an angle α between two edges 46 are also depicted in FIGS. 5A and 5B.

FIG. 5C shows a top view of the arrangement of protrusions 40 on the tissue-holding surface 21 (the area enclosed by the dashed box). The edges of the pyramid-shaped protrusions 40 are depicted as dashed lines, wherein the respective peaks 41 of the pyramids 43 are positioned at the respective intersection of the edges (dashed lines). The position of the peaks 41 is also displayed in FIGS. 5A and 5B.

Figure 6:
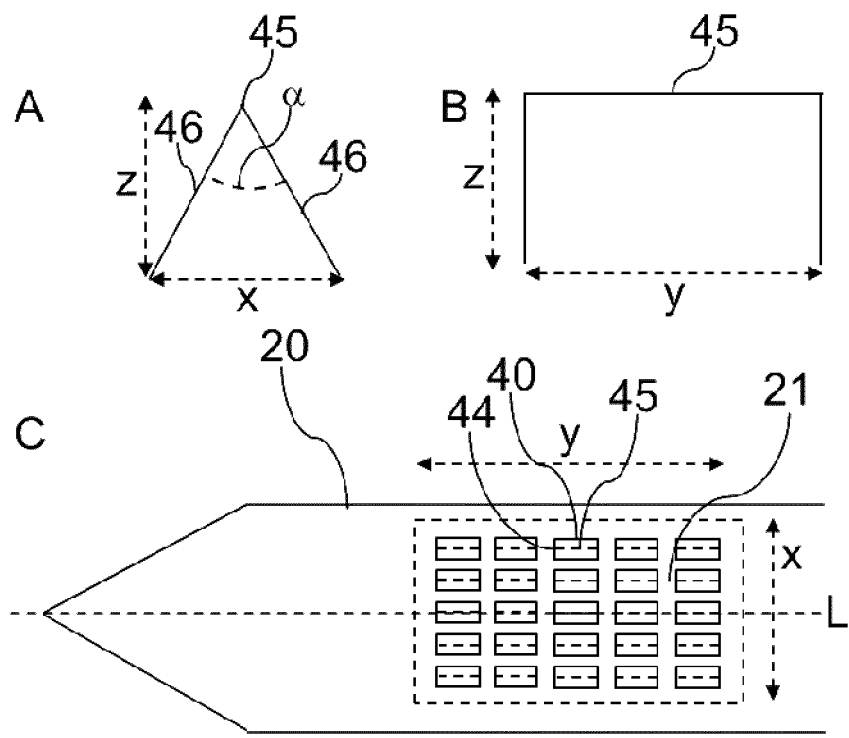
FIG. 6 shows schematics of a tissue-holding surface of a core biopsy needle according to the invention, comprising saw tooth shaped protrusions in a first arrangement.

FIG. 6 shows a further embodiment of the tissue-holding surface 21 comprising protrusions 40 having a saw tooth shape.

FIG. 6A shows the triangular cross-section of a saw tooth shaped protrusion 40 along the plane formed by the width x and the height z, and FIG. 6B shows a rectangular cross-section of the protrusion 40 along the plane formed by the length y and the height z. Two edges 46 of the triangular cross-sectional shape arranged at an angle α are also depicted in FIG. 6A. Therein, the angle α may be an acute, obtuse, or right angle. In particular, the angle α is between 0° and 90°. The two edges 46 adjacent to the angle α are particularly of equal length, in other words the respective triangular shape is an isosceles triangle.

FIG. 6C shows a top view of an arrangement of saw tooth shaped protrusions 40 on the tissue-holding surface 21 (enclosed by dashed box). The shapes of the respective bases 44 of the protrusions 40 are depicted as solid lines, and ridges 45 (lines of maximum height z) are displayed as dashed lines. The position of the ridge 45 in the respective cross-section is also depicted in FIGS. 6A and 6B.

In the embodiment shown in FIG. 6C, the protrusions 40 comprise rectangular bases, wherein the longer edges of the respective rectangles and the central ridges 45 extend along the length y.

Figure 7:
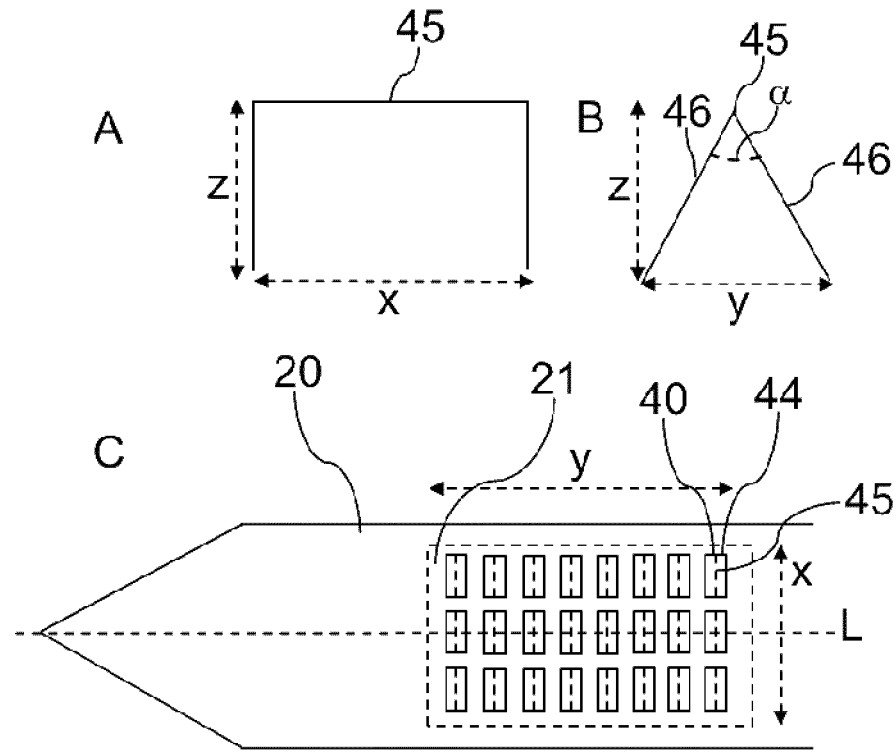
FIG. 7 shows schematics of a tissue-holding surface of a core biopsy needle according to the invention, comprising saw tooth shaped protrusions in a second arrangement.

FIG. 7 shows a further embodiment of the tissue-holding surface 21 comprising protrusions 40 having a saw tooth shape.

FIG. 7A shows the rectangular cross-section of a saw tooth shaped protrusion 40 along the plane formed by the width x and the height z, and FIG. 7B shows a triangular cross-section of the protrusion 40 along the plane formed by the length y and the height z. Two edges 46 of the triangular cross-sectional shape arranged at an angle α are also depicted in FIG. 7B. Therein, the angle α may be an acute, obtuse, or right angle. In particular, the angle α is between 0° and 90°. The two edges 46 adjacent to the angle α are particularly of equal length, in other words the respective triangular shape is an isosceles triangle.

FIG. 7C shows a top view of an arrangement of saw tooth shaped protrusions 40 on the tissue-holding surface 21 (enclosed by dashed box). The shapes of the respective bases 44 of the protrusions 40 are depicted as solid lines, and ridges 45 (lines of maximum height z) are displayed as dashed lines. The position of the ridge 45 in the respective cross-section is also depicted in FIGS. 7A and 7B.

In the embodiment shown in FIG. 7C, the protrusions 40 comprise rectangular bases, wherein the longer edges of the respective rectangles and the central ridges 45 extend along the width x.

Figure 8:
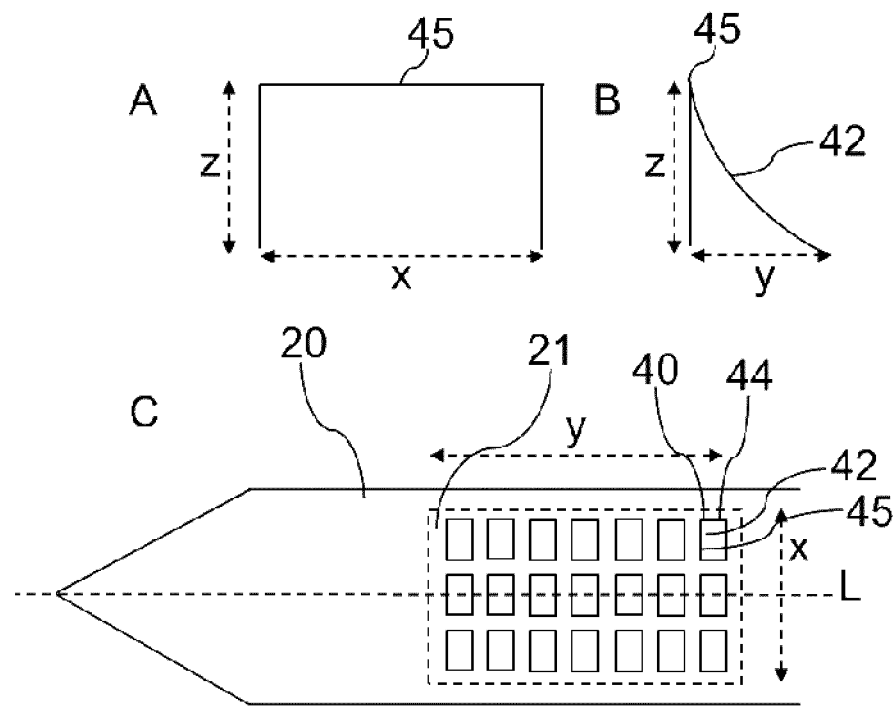
FIG. 8 shows schematics of a tissue-holding surface of a core biopsy needle according to the invention, comprising shark fin shaped protrusions.

FIG. 8 shows a further embodiment of the tissue-holding surface 21 comprising protrusions 40 having a shark fin shape.

FIG. 8A shows the rectangular cross-section of a shark fin shaped protrusion 40 along the plane formed by the width x and the height z, and FIG. 7B shows the cross-section of the shark fin shaped protrusion 40 along the plane formed by the length y and the height z, wherein a curvature 42 of the surface between a ridge 45 (line of maximum height z) and the lowest point of the protrusion 40 is displayed in FIG. 8B.

FIG. 8C shows a top view of an arrangement of shark fin shaped protrusions 40 on the tissue-holding surface 21 (enclosed by dashed box). The shapes of the respective rectangular bases 44 of the protrusions 40 are depicted as solid lines. The ridges 45 coincide with the respective left long edge of the respective rectangular base 44. The position of the ridge 45 is also depicted in FIGS. 8A and 8B.

Figure 9:
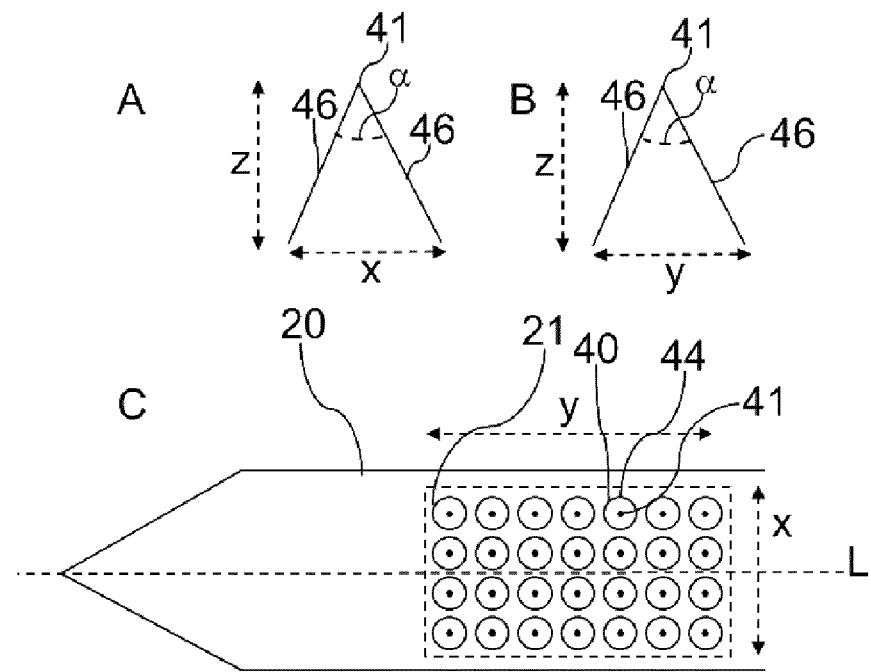
FIG. 9 shows schematics of a tissue-holding surface of a core biopsy needle according to the invention, comprising brush shaped protrusions.

FIG. 9 shows a further embodiment of the tissue-holding surface 21 comprising protrusions 40 having a brush like shape.

FIG. 9A shows the triangular cross-section of a brush like protrusion 40 along the plane formed by the width x and the height z, and FIG. 9B shows the triangular cross-section of the brush like protrusion 40 along the plane formed by the length y and the height z. Two edges 46 of the triangular cross-sectional shape arranged at an angle α are also depicted in FIGS. 9A and 9B. Therein, the angle α may be an acute, obtuse, or right angle. In particular, the angle α is between 0° and 90°. The two edges 46 adjacent to the angle α are particularly of equal length, in other words the respective triangular shape is an isosceles triangle.

FIG. 9C shows a top view of an arrangement of brush like protrusions 40 on the tissue-holding surface 21 (enclosed by dashed box). The shapes of the respective circular bases 44 of the protrusions 40 are depicted as solid lines, and the peaks 41 (points of maximal height z) are indicated as dots. The position of the peaks 41 is also depicted in FIGS. 9A and 9B.

Further embodiments and advantages of the present invention may be derived from the following example.

EXAMPLE

Based on the analysis of native tissue surface waviness and roughness approximately 20 different micro-patterns with varying size (e.g. but not limited to: xy dimension 20-100 μm and z dimension 10-80 μm) and shape (e.g. but not limited to: pyramids, brushes, saw tooth, shark fin) were designed. These microstructures were laser ablated into stainless steel plates, which were used as templates for polymer molding (for example into PDMS) of the structures.

Dynamic and static friction behavior between stainless steel templates or PDMS molds and cow udder tissue specimens were measured to identify the most adhesive microstructures (structure selection shown in Table 1, most potent structures in bold letters). Therein, $\mu_{stat,Str}$ refers to the static friction coefficient of the structured surface, $\mu_{stat,Unstr}$ refers to the static friction coefficient of the unstructured surface, and $\mu_{dyn,Str}$ refers to the dynamic friction coefficient of the structured surface.

As an example but not limited to, polymer molds that include PDMS and a cyanoacrylate bases glue were tested. Adhesion experiments have also been performed on chemically modified polymer microstructures. As an example but not limited to; PDMS surfaces have been functionalized with Arginine-Glycine-Aspartic acid (RGD), Poly-L-lysine (PLL), Collagen I and/or a cyanoacrylate based glue.

Successful extraction of cow udder core biopsy by micro structuring (selected from Table 1) commercially available 20 gauge core biopsy needles was achieved. The patterning was performed either by direct laser ablation into or by micro structuring polymer coatings onto the inner needle notch.

Figure 10:
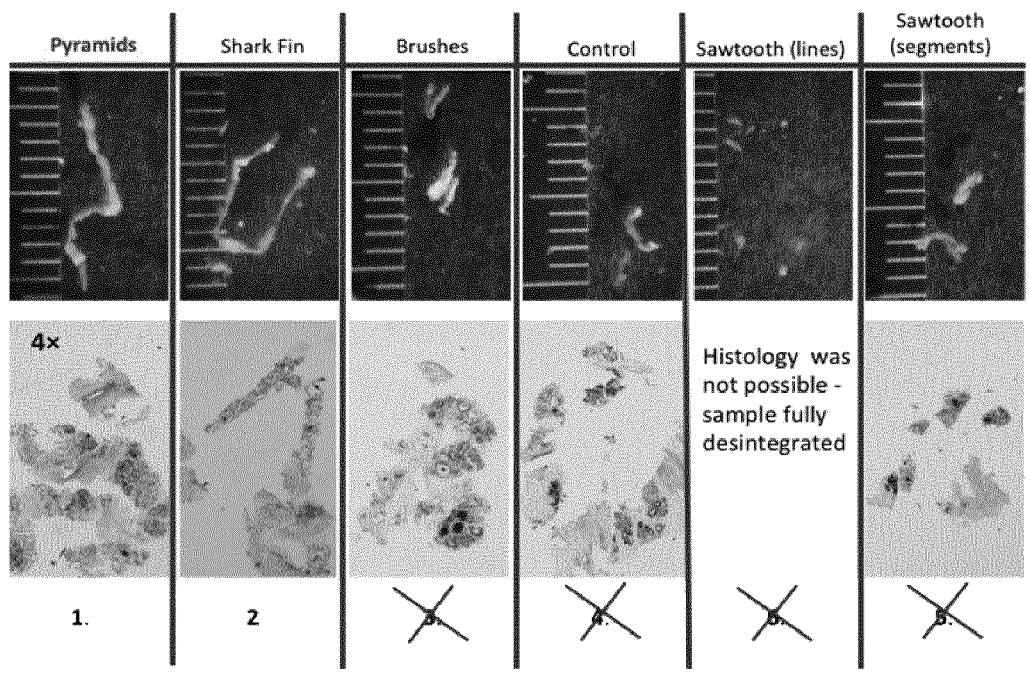
FIG. 10 shows micro biopsy needle grading based on the quality of the extracted tissue for histopathology.

Extracted tissue specimens were examined by standard histopathology (Haematoxilin & Eosin staining) to determine tissue integrity and cell preservation (FIG. 10). The main criterion was to obtain a compact and non-fragmented biopsy that is acceptable for histopathology. In contrast to micro structured needles according to the present invention, biopsies from non-modified standard 20 gauge core biopsy needles were fragmented and could not be used for histopathology.

TABLE 1

List of tested micro patterned adhesive surfaces

| Structure | $\frac{\mu_{stat,Str}}{\mu_{dyn,Unstr}}$ | Static Rank | $\frac{\mu_{dyn,Str}}{\mu_{dyn,Unstr}}$ | Dynamic Rank | Spring Constant [Nmm$^{-1}$] |
|---|---|---|---|---|---|
| Pyramids | 5.2 | 2 | 7.8 | 1 | 0.155 |
| Pyramids inv. | 2.7 | 6 | 2.8 | 7 | 0.021 |
| Saw tooth 1 | 10.9 | 1 | 5.3 | 4 | 0.112 |
| Saw tooth 2 | 3.3 | 4 | 4.7 | 5 | 0.073 |
| Shark Fin 1 | 3.1 | 5 | 5.8 | 2 | 0.055 |
| Shark Fin 2 | 5.1 | 3 | 5.6 | 3 | 0.072 |
| Brush 1 | 1.9 | 8 | 4.2 | 6 | 0.065 |
| Brush 2 | 2.5 | 7 | 7.8 | 1 | 0.153 |

LIST OF REFERENCE SIGNS

| | |
|---|---|
| 1 | Core biopsy needle |
| 10 | Outer needle |
| 11 | Cutting edge |
| 20 | Inner needle |
| 21 | Tissue-holding surface |
| 22 | Stitching edge |
| 23 | Facet cut |
| 24 | Notch |
| 3 | Tissue |
| 30 | Tissue region, particularly tumour |
| 31 | Tissue sample |
| 32 | Cut |
| 40 | Protrusion |
| 41 | Peak |
| 42 | Curvature |
| 43 | Pyramid |
| 44 | Base |
| 45 | Ridge |
| 46 | Edge |
| L | Longitudinal axis |
| $e_{max}$ | Maximum extension |
| x | Width |
| y | Length |
| z | Height |
| α | angle |

The invention claimed is:

1. A core biopsy needle (1) for obtaining a tissue sample comprising:
   a hollow outer needle (10) extending along a longitudinal axis (L),
   an inner needle (20), which is at least partially arranged or arrangeable within said outer needle (10) along said longitudinal axis (L),
   wherein,
   said inner needle (20) comprises a notch (24) extending through the inner needle in a direction transverse to the longitudinal axis (L), the notch comprising a bottom, and at least one tissue-holding surface (21) positioned at the bottom of the notch, wherein said tissue-holding surface (21) is adapted such that a tissue (3) adheres to the at least one tissue-holding surface (21), when the core biopsy needle (1) is inserted into the tissue (3), wherein said outer needle (10) comprises a maximum extension ($e_{max}$) transversely to said longitudinal axis (L) of less than 1.2 mm, wherein said at least one tissue-holding surface (21) comprises a plurality of protrusions (40), each having a length (y) extending along said longitudinal axis (L), a width (x) extending in a circumferential direction in respect of said longitudinal axis (L), and a height (z) extending in a radial direction in respect of said longitudinal axis (L), wherein the height (z) is in the range from 10 μm to 80 μm, and wherein the ratio between said width (x) and said length (y) of said protrusions (40) or the ratio between said length (y) and said width (x) of said protrusions (40) is at least 2 to 1.

2. The core biopsy needle (1) according to claim 1, characterized in that said outer needle (10) comprises a maximum extension ($e_{max}$) transversely to said longitudinal axis (L) of less than 1 mm.

3. The core biopsy needle (1) according to claim 1, characterized in that said width (x) is selected from 1 μm to 100 μm, and 10 μm to 80 μm; or said length (y) is selected from 1 μm to 100 μm, and 10 μm to 80 μm.

4. The core biopsy needle (1) according to claim 1, characterized in that said protrusions (40) comprise respective peaks (41) positioned at a maximum height (z) of said respective protrusion (40).

5. The core biopsy needle (1) according to claim 1, characterized in that a surface of said protrusions (41) comprises a curvature (42), wherein said surface is concave.

6. The core biopsy needle (1) according to claim 1, characterized in that said protrusions (40) are selected from:
   shaped as pyramids (43), shaped as pyramids comprising a square-shaped base (44), shaped as cones, shaped as truncated cones, shaped as cylinders, shaped as cylinders comprising a circular base, protrusions comprising a triangular cross-sectional shape perpendicular to the width (x) and a rectangular or square-shaped cross-sectional shape perpendicular to the length (y),
   protrusions comprising a triangular cross-sectional shape perpendicular to the length (y) and a rectangular or square-shaped cross-sectional shape perpendicular to the width (x), protrusions comprising a cross-sectional shape perpendicular to the width (x) or the length (y), wherein said cross-sectional shape is delimited by at least three edges, wherein at least one of the edges is curved.

7. The core biopsy needle (1) according to claim 1, characterized in that said tissue-holding surface (21) comprises at least one tissue-adhesive compound which is adapted to adhere to said tissue by one of: chemisorption and physisorption, chemisorption, physisorption.

8. The core biopsy needle (1) according to claim 7, characterized in that said at least one tissue adhesive compound is selected from a glue, a silicon composite, and a cyanoacrylate.

9. The core biopsy needle (1) according to claim 7, characterized in that said at least one tissue-adhesive compound is bio-compatible.

10. The core biopsy needle (1) according to claim 7, characterized in that said at least one tissue-adhesive compound is selected from a polymer, a biopolymer, a peptide, a polypeptide, a protein, arginine-glycine-aspartic acid tripeptides, poly-L-lysine, albumin, collagen I, fibrin, and gelatin.

11. The core biopsy needle (1) according to claim 7, characterized in that said at least one tissue-adhesive compound is selected from a chemical cross-linker, an aldehyde, formaldehyde, and glutaraldehyde.

12. A core biopsy needle (1) for obtaining a tissue sample comprising:
   a hollow outer needle (10) extending along a longitudinal axis (L),
   an inner needle (20), which is at least partially arranged or arrangeable within said outer needle (10) along said longitudinal axis (L),
   wherein,
   said inner needle (20) comprises a notch (24) extending through the inner needle in a direction transverse to the longitudinal axis (L), the notch comprising a bottom, and at least one tissue-holding surface (21) positioned at the bottom of the notch, wherein said tissue-holding surface (21) is adapted such that a tissue (3) adheres to the at least one tissue-holding surface (21), when the core biopsy needle (1) is inserted into the tissue (3), wherein said outer needle (10) comprises a maximum extension ($e_{max}$) transversely to said longitudinal axis (L) of less than 1.2 mm, wherein said at least one tissue-holding surface (21) comprises a plurality of protrusions (40), each having a length (y) extending along said longitudinal axis (L), a width (x) extending in a circumferential direction in respect of said longitudinal axis (L), and a height (z) extending in a radial direction in respect of said longitudinal axis (L), wherein the height (z) is in the range from 10 μm to 80 μm, and wherein the ratio between said height (z) and said width (x) or the ratio between said height (z) and said length (y) of said protrusions (40) is at least 1 to 1.

* * * * *